INVENTORS
Virgil L. Helgeson &
BY Edward J. Loper

E. W. Christen
ATTORNEY

United States Patent Office 3,070,307
Patented Dec. 25, 1962

3,070,307
CROSS-WIND COMPENSATION COMPUTER
Virgil L. Helgeson and Edward J. Loper, Milwaukee, Wis., assignors to General Motors Corporation, Detroit, Mich., a corporation of Delaware
Original application July 16, 1956, Ser. No. 598,034, now Patent No. 2,988,960. Divided and this application Nov. 28, 1958, Ser. No. 777,813
1 Claim. (Cl. 235—187)

This invention relates to aircraft bombing computer systems for providing a solution to a bombing problem. This application is a division of S.N. 598,034 filed July 16, 1956, now Patent No. 2,988,960.

Such systems require for the successful solution of a bombing problem that the aircraft be flown along a path which at some point is tangent to a bomb trajectory intersecting the target. To this end, computers have been designed to effect bomb release when the aircraft is flown at a predetermined velocity through a predetermined point of tangency to a predicted bomb trajectory intersecting the target. In these systems, all of the initial conditions are determined prior to the flight of the craft, and the pilot simply flies the craft at a predetermined speed and altitude along a given flight course and releases the bomb at a particular angle at a predetermined point. While relatively simple systems can be instrumented on this basis, such systems are limited in their operation to a few precomputed attack courses and their inflexibility is of considerable tactical and operational disadvantage.

To overcome these and other disadvantages we have invented a bombing computer which continuously solves the horizontal and vertical distance equations in the vertical plane containing the craft and target and does not impose any restrictions on the approach, direction, altitude, speed and pull-out maneuver of the craft. Such a bombing computer is the subject of the aforementioned patent application.

In general, that invention provides a bombing computer which derives a plurality of functionally related distance signals from airborne information including the horizontal distance of the craft to the target, the velocity of the craft relative to the target, the true airspeed or velocity of the craft relative to the air mass, the velocity of the air mass relative to the target and the height of the aircraft above the target and instruments these signals into a bomb release equation which is continuously solved to determine the appropriate bomb release point. Initial conditions are determined in flight by tracking the target and establishing either an optical or a pseudo-sight line intersecting the target with an optical sight head or combination of sight head and mapping radar and by ranging on the target to determine the horizontal distance of the craft to the target at an initial point along the flight path. Upon acquiring and tracking the target with the sight, the horizontal distance of the craft to the target is memorized at this point, hereinafter called the pickle or aim point. Thereafter, the distance the craft has flown in a horizontal direction toward the target from the pickle point and the horizontal trajectory of the bomb are continuously measured and subtracted from the memorized horizontal craft to target distance to effect bomb release when the difference of these distances passes through zero. After establishment of the initial conditions including the memorization of the pickle distance, the craft may be flown in any manner and may execute any maneuver in the vertical plane containing the craft and target and still be able to release the bomb to strike the target.

It is an object of the invention disclosed and claimed herein to provide a bombing computer of the aforementioned character provided with a wind computer for determining and accounting for the effect of cross-wind causing relative motion between the craft and target.

The above and other objects, features and advantages of the present invention will appear more fully from the following detailed description and drawings wherein.

The bombing computer is adapted for solution of the bombing problem in several different approach modes. For purposes of illustration, the dive-toss will be described herein and the general release equation governing the solution to the bombing problem is developed with reference to FIGURE 1. Initial aircraft position information is obtained by diving on the target along a collision path established with the aid of a sighting device, such as a sight head 10 shown in FIG. 2, with which the pilot may optically track the target. At some point along the dive path, herein named the aim or pickle point, the ground distance of the craft to the target T is memorized, the value of this distance at pickle being represented by the symbol $D_p$. Thereafter, the horizontal distance $d_a$, representing the horizontal distance that the craft has flown from the pickle point, together with the horizontal range distance $R_h$, representing the horizontal component of the bomb trajectory or the horizontal distance that the bomb will travel from release, are continuously computed and subtracted from the pickle distance $D_p$ to give the general release equation below:

$$D_p - d_a - R_h = 0 \qquad (1)$$

Figure 2:
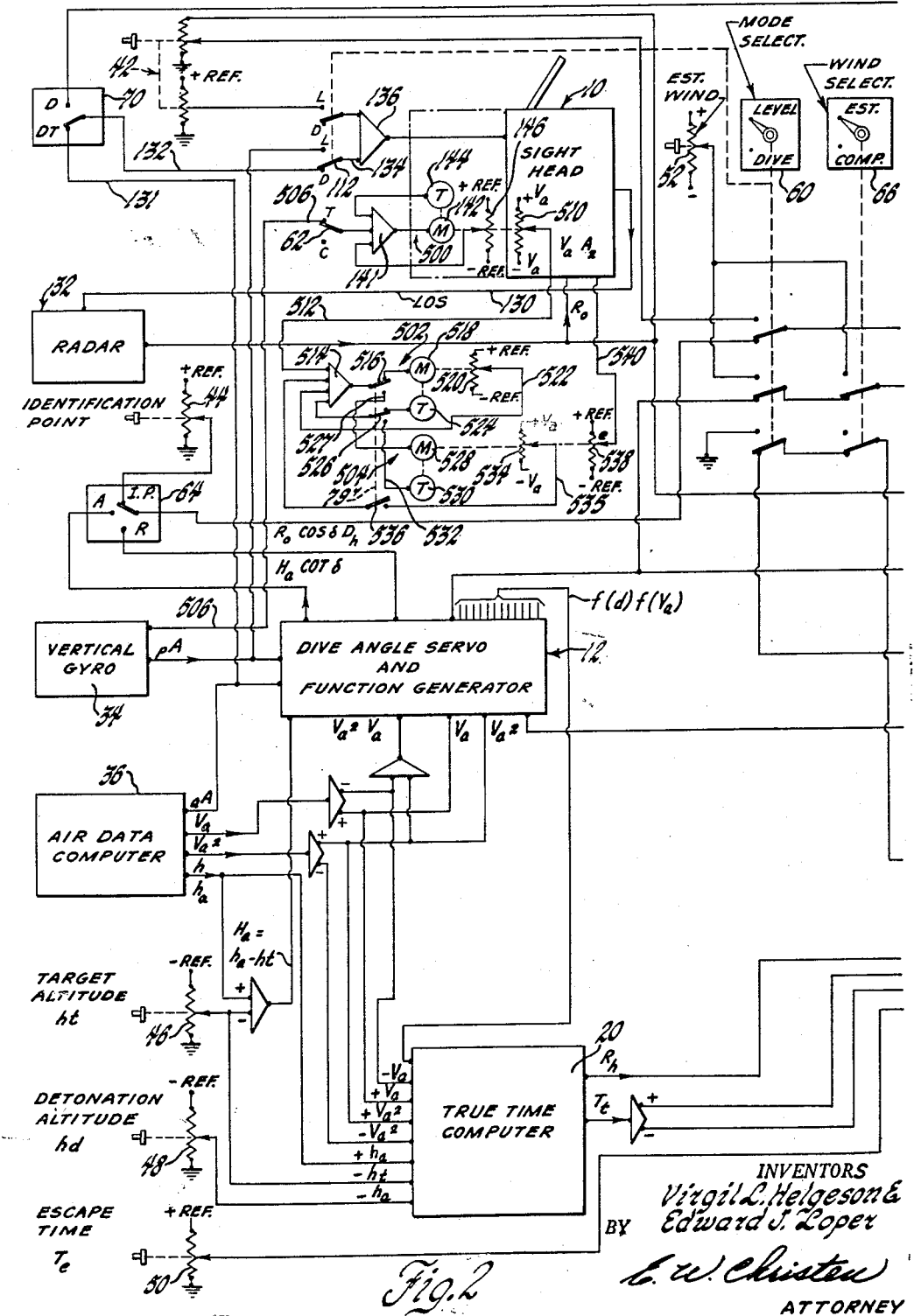
FIGS. 2 and 2a are an electrical schematic representation of the general organization of a form of bombing computer in accordance with the present invention.
Figure 2A:
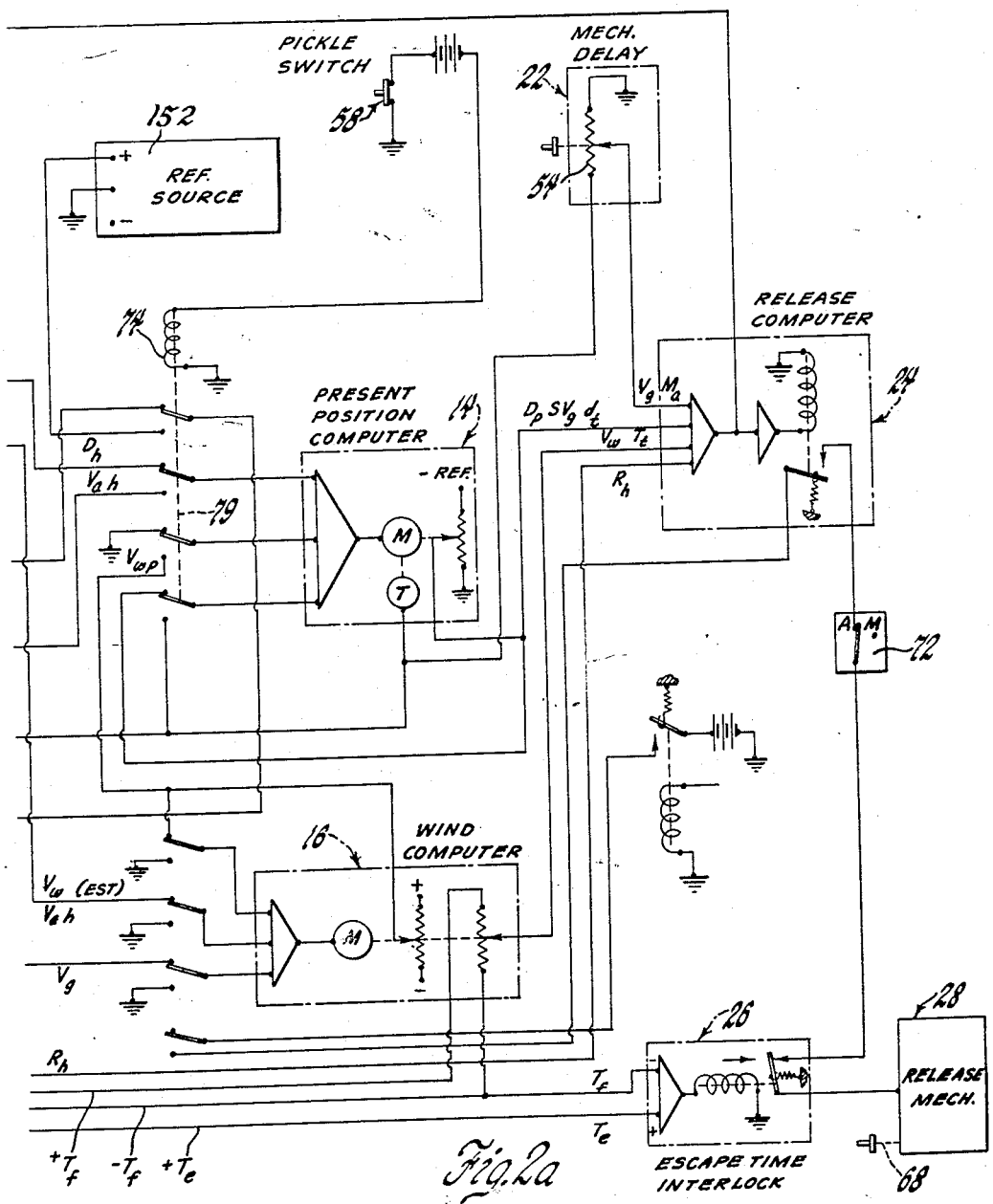

Referring now to FIGURES 2 and 2a, the computer system is shown for mechanizing the release Equation (1).

The distance $D_p$ may be obtained either by radar ranging on the target by radar equipment 32 to obtain the slant range distance $R_o$ or by altimeter ranging using an air data computer 36 to obtain the vertical distance $H_a$, representing the height of the craft above the horizontal target plane, and by trigonometrically resolving either of these quantities by the dive angle $DA$ included between the sight line and the horizontal. The dive angle is derived by a dive angle servo 12 and is composed of the aircraft pitch angle $pA$, representing the angle between the horizontal and the fuselage reference line or zero lift line of the craft, and the craft angle of attack, $aA$, which is measured between the zero lift line and the true airspeed vector $V_a$ directed along the sight line. The pitch angle information is derived from a vertical gyro 34. From this data, the horizontal distance $D_p$ of the craft from the pickle point to target can be computed according to the following relationship:

$$D_p = R_o(\cos DA) \qquad (2)$$

In the event that radar information is not available, the height $H_a$ of the pickle point above the target plane can be employed in place of $R_o$, in which case the following expression $D_p$ may be employed:

$$D_p = H_a(\cot DA) \qquad (3)$$

Figure 1:
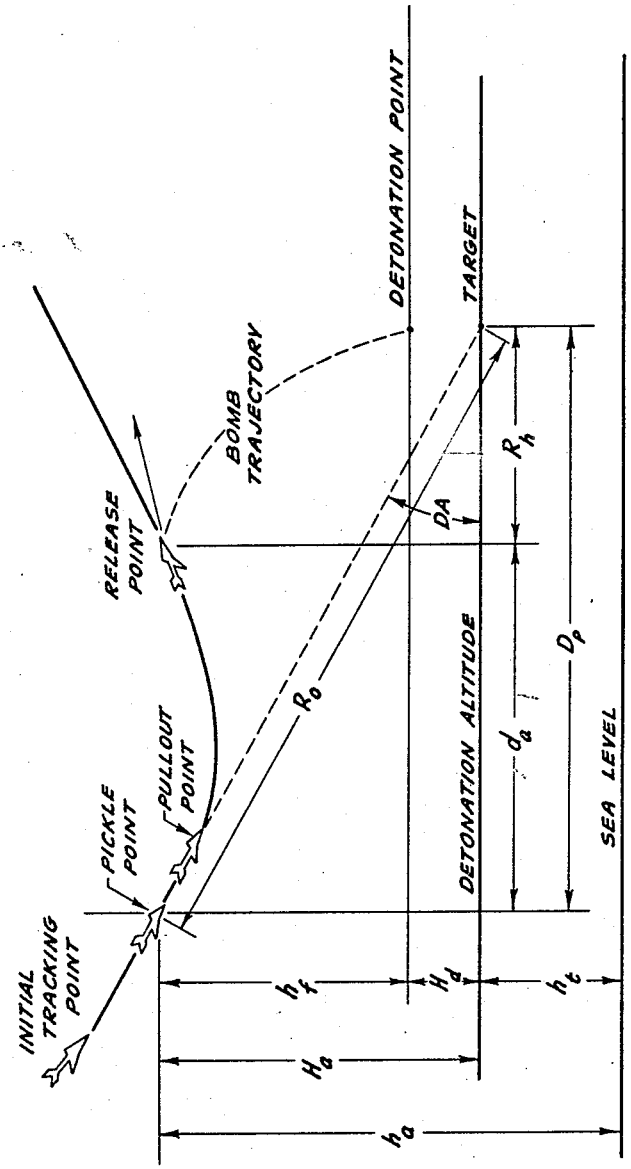
FIGURE 1 is a graphical representation of the geometry involved in the solution of the dive toss bombing problem.

As is evident from FIGURE 1, $H_a$ is equal to the difference between the altitude quantity $h_a$, representing the absolute altitude of the craft above sea level or a reference plane, and the quantity $h_t$, representing the known target altitude above sea level or reference plane.

The distance $d_a$, representing the distance of the craft from the pickle point measured in a horizontal direction, is computed directly in a present position computer 14 as the time integral of the ground velocity $V_g$ of the aircraft relative to the target from the instant of pickle to release, as expressed below:

$$d_a = \int_P^R V_g dt \quad (4)$$

The quantity $V_g$ may be expressed as the difference between the horizontal component of true air speed and relative target motion including range wind according to the following equation:

$$V_g = V_a \cos DA - V_w \quad (5)$$

where, $V_a$ is a true air speed; $V_w$ is range wind.

Provision is made in the bombing computer for the selection of either a hand-set estimated statistical wind or a computed value of wind at pickle. Computed wind is obtained from a range wind computer 16 which substracts the horizontal component of true air speed from the time rate of change of the horizontal distance to the target or the horizontal component of slant range in accordance with the expression below:

$$V_w = V_a \cos DA - \frac{d}{dt}(R_o \cos DA) \quad (6)$$

The horizontal trajectory range distance $R_h$ is a function of the quantity $T_t$, which represents the true time of fall of the bomb along a predicted trajectory. In the bombing computer 20, the quantities $R_h$ and $T_t$ are provided by a true time computer which performs an implicit solution for $T_t$ and $R_h$ for each point along the flight path during the bombing mode.

Provision is made in the bombing computer to account for relative motion due to range and/or target motion during the bomb toss or true time of fall of the bomb along the bomb trajectory. This factor, $V_w T_t$, developed in the wind computer 16, has the dimensions of a distance representing the relative displacement of the target during the bomb fall after the bomb is tossed or released into the moving air mass and is instrumented into the general release equation which may then be expressed as follows:

$$D_p - \int V_g dt - R_h - V_w T_t = 0 \quad (7)$$

The computer is also instrumented to account for the horizontal ground distance traversed by the craft during any time delay inherent in the bomb release mechanism from the time that the bomb release signal is applied to the bomb release mechanism to the time that the bomb is actually released. Since this distance may be appreciable, particularly in the case of high speed bombing craft, it will affect the accuracy of the bombing system. Therefore, a mechanism delay computer 22 is provided and the general release equation is corrected by this factor represented by the quantity $V_g M_d$ to cause actuation of the release mechanism in advance of the release point in accordance with the following expression:

$$D_p - V_g dt - R_h - V_w T_t - V_g M_d = 0 \quad (8)$$

where $V_g$ is the ground velocity of the craft and $M_d$, the mechanism delay time. The mechanism delay correction computer is developed more fully in copending U.S. patent application S.N. 598,050, now Patent No. 2,995,985, entitled Bomb Release Mechanism Delay Correction Computer, filed on July 16, 1956, in the names of Virgil L. Nelgeson and Edward J. Loper, assigned to the present assignee.

The instantaneous position, flight attitude, velocity and altitude of the craft throughout the bombing mode are continuously measured by the aforementioned dynamic data sources including the radar ranging apparatus 32, vertical gyro 34, and the air data computer 36. Other data signals representing the sight depression angle (SDA), identification point distance (I.D.), target altitude ($h_t$) above sea level, detonation altitude ($h_d$), escape time ($T_e$), estimated wind ($V_{we}$) and mechanism delay time ($M_d$) are obtained from a number of hand set data sources in the form of adjustable potentiometer devices, for example, including a sight depression angle potentiometer assembly 42, I.D. pot 44, target altitude pot 46, detonation altitude pot 48, escape time pot 50, estimated wind pot 52, and a mechanism delay potentiometer 54 which is included in the mechanism delay correction computer 22.

The system also includes a number of manually operable switching devices including a pickle switch 58 (FIG. 2a), a bombing mode selector switch 60, a trackcage selector switch 62, a range selector switch 64, a wind selector switch 66 and a manual bomb release switch 68. A manually operable dive-dive toss selector switch 70 also may be provided to afford an additional selection between the pure dive and dive toss operating modes. A manual or relay operated selector switch 72 may be provided to afford a further selection between manual or automatic release in the pure dive mode.

In general, the release Equation 8 is solved by a release computer 24 which is supplied with the signal quantities set forth in Equation 8. When this equation is satisfied, the output of the release computer becomes zero and a release signal is supplied through an escape time interlock 26 to a release mechanism 28.

Figure 3:
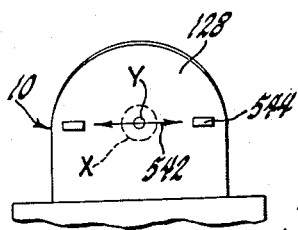
FIGURE 3 illustrates a form of reticle presentation of the sight head.

The sight head 10 may be a conventional servo driven optical sight head such as the model A-4 sight and may produce a fixed reticle display, such as a ten mil diameter segmented circle X, and a tracking index or center pipper Y, which may be, say a 2 mil dot, as shown in FIG. 3, for example. Both the circle and pipper are projected and displayed in illuminated form on a transparent combining glass shown at 128 or on the windshield of the aircraft in the direct view of the pilot. The optical system producing the center pipper or tracking index may be displaced in elevation by a suitable servo drive mechanism which is associated with an elevation input channel customarily provided in sight heads of this character. The pipper normally represents the fuselage reference line or zero lift line of the craft. When the circle and the dot or pipper are aligned, the line of sight is directed along the fuselage reference line. Tracking of the target is performed by the pilot by maneuvering the aircraft so that the pipper is superimposed on the target. As is customary in sight heads of this character, the sight head also produces an electrical signal whose magnitude represents the direction of the line of sight (LOS) of the sight head. This signal is supplied over conductor 130 to the servo drive for the radar antenna so that the radar will be slaved to the line of sight and directed at the target.

It will be appreciated that the sight head is not used in a predicting or computing capacity in the dive toss, level and level toss approach modes, but merely to provide a fixed sight line which may be displaced in elevation and azimuth to facilitate target tracking in these modes. In the dive mode, for example, attack angle information is fed over a circuit traced from the air data computer over conductor 131, the dive-dive toss selector switch 70 in its lower contact or dive toss position, conductor 132 to the lower contact or dive mode position of arm 112 of the mode selector switch 60, conductor 134 connected to the input of an amplifier 136 in the elevation channel of the sight head. This enables the pilot to displace the movable pipper Y and the sight line in elevation by the amount of the attack angle $aA$ so that the sight line will be parallel to the direction of movement or the velocity vector of the craft, thereby enabling the pilot to keep the pipper on the target regardless of variations in dive angle or throttle setting. If the sight line were retained in its normal setting directed along the fuselage reference line, it would be necessary for the pilot to change the attitude of the craft continuously during the dive toss approach by nosing the plane upwardly in order to fly a path aimed at the target and to keep the pipper on the target.

The alternating current reference voltage source 152 provides a pair of oppositely phased voltage outputs that are balanced with respect to ground and are synchronized with respect to the A.C. signal outputs of the various dynamic data sources, the instantaneous relative phases of the balanced outputs being represented herein by plus and minus symbols. The reference source 152 provides the energization for the various hand set data source potentiometers, feedback potentiometers and computing potentiometers and the reference windings of the various servo positioning motors used throughout the instrumentation of the present bombing computer system.

In accordance with this invention and in order to ensure accuracy in the bombing system, provision is made to compensate for the effects of any relative motion of the air mass and target in a direction normal to the vertical plane containing the pickle point, and the target. Any such relative motion, which will be referred to herein as cross-velocity or cross-wind, may be considered to have two adverse effects in the accuracy of the system. First, it tends to displace the aircraft from the vertical plane containing the pickle point and target and second, the velocity vector of the aircraft in ground coordinates is displaced from this vertical plane. In order to accomplish the necessary compensation, means are provided to enable the pilot to maintain the velocity vector of the aircraft in the prescribed vertical plane from the pickle point to the point of bomb release. This compensation may be realized with the required degree of accuracy if it is assumed that the velocity of the cross-wind remains constant throughout the bombing run. It is well known that the cross-wind compensation achieved is a function of the velocity of the aircraft with respect to the air mass and the yaw angle or azimuthal displacement of the aircraft heading with respect to an initial or reference heading. Since the velocity of the aircraft may vary substantially in the bombing run from pickle to release, especially in a pull-up maneuver, it is necessary to continuously vary the yaw angle of the aircraft to obtain instantaneously correct compensation. In general, this is accomplished by determining the magnitude of the cross-wind at the pickle point and determining the instantaneous compensation which is being made in terms of cross or lateral velocity with respect to the air mass. The difference of these quantities represents the heading or yaw error in terms of velocity. This velocity error may then be translated into angular or heading error which is presented to the human or automatic pilot, as the case may be, as an indication of the amount of roll angle which must be imparted to the aircraft in order to provide a resultant yaw angle to produce the instantaneously correct compensation.

The mechanization for this cross-wind compensation is illustrated in FIGURE 2 in the azimuth channel of the sight head 10 and includes, generally the yaw angle servo 500, the cross-wind servo 502 and the error angle servo 504. A yaw angle signal voltage $A_z$ is derived from the vertical gyro 34 on the conductor 506 which is connected to the contact T of the track-cage selector switch 62. The yaw signal voltage is proportional to the angular displacement of the aircraft from a reference position about the local gravity vector. The track-cage selector switch 62 is closed against the open circuit contact C until the bombing run is commenced. Upon acquiring the target within the pipper, as explained above, the selector switch 62 is closed against the contact T and the yaw angle signal voltage is supplied to the summing and servo amplifier 141 in the yaw angle servo 500. This servo also includes the reversible servo motor 142 having a servo shaft connected with the movable contact of the follow-up potentiometer 146. The follow-up potentiometer 146 is excited with the reference voltage and the movable contact is connected to the input of the amplifier 141 to provide a follow-up signal to close the servo loop. A rate signal or tachometer generator 144 is shaft coupled with the motor 142 and develops a rate signal which is applied as a stabilization feedback voltage to the amplifier 141. The servo 500, therefore, operates to displace its output shaft an amount corresponding to the instantaneous value of yaw angle. Therefore, by tracking or maintaining the pipper on the target for a brief interval the shaft of servo 500 is displaced an amount corresponding to the yaw angle required to compensate for the cross-wind at the existing velocity. A potentiometer 510 is excited with the velocity signal voltage $V_a$ corresponding to the speed of the aircraft relative to the air mass and includes a movable contact which is also driven by the shaft of servo 500. The signal voltage developed on the movable contact of potentiometer 510 therefore corresponds to the product of the instantaneous aircraft velocity and the yaw angle. For small angles of yaw, the angle is approximately equal to the sine of the angle and therefore the signal voltage on the movable contact of potentiometer 510 corresponds to the instantaneous value of cross-wind $V_x$. This signal voltage is applied through conductor 512 to the summing and servo amplifier 514. This amplifier 514 is utilized in the cross-wind servo 502 and is connected through switch contacts 516 to the servo motor 518. The servo 502 has an output shaft connected with the movable contact of the potentiometer 520 which is excited with the reference voltage as indicated. The movable contact of the potentiometer is connected through the conductor 522 to the input of the amplifier 514 to close the servo loop. A rate stabilization signal voltage is derived from the tachometer generator 524 and applied to the input of the amplifier 514 through switch contacts 526. During the interval when the pipper is maintained on the target, the output shaft of servo 502 positions the movable contact of potentiometer 520 to develop a signal voltage proportional to the cross-wind velocity $V_x$.

At the termination of this tracking interval, the pickle switch 58 (FIGURE 2a) is closed and the relay 74 is energized. The switch actuating linkage 79 (FIGURE 2a) is suitably connected with the switch actuating linkage 79' (FIGURE 2). Accordingly, actuation of the pickle switch causes the switch contacts 516 and 526 to be displaced to the lower position. The actuation of switch 516 interrupts the input to motor 518 and interrupts the output of tachometer 524 and the output shaft of the servo 502 is frozen in the position existing at the instant of pickle switch operation. Accordingly, the cross-wind velocity $V_x$ at the pickle point is memorized by the cross-wind servo 502 as represented by the signal voltage on conductor 522.

Upon the actuation of the pickle switch in the manner just described, the output of the amplifier 514 is applied through the switch contacts 516 and conductor 527 to the servo motor 528 of the error angle servo 504. The servo 504 includes a tachometer generator 530 which develops a rate signal feedback voltage which is supplied through conductor 532 and switch contacts 526 to the input of amplifier 514. The servo 504 also includes a follow-up potentiometer 534 excited with the velocity signal voltage $V_a$ as indicated. The potentiometer 534 includes a movable contact driven by the output shaft of servo 504 and connected through conductor 535 and switch contacts 536 to the input of amplifier 514. The switch contacts 536 are also actuated by the linkage 79' to the closed position upon the actuation of the pickle switch.

Therefore, after the actuation of the pickle switch, the amplifier 514 receives an input signal voltage $V_a A_z$ on conductor 512 corresponding to the instantaneous value of correction being made to compensate for the cross-wind. The amplifier 514 also receives a signal voltage $V_x$ on conductor 522 corresponding to the memorized value of cross-wind velocity at the pickle point. Additionally, a rate stabilization feedback signal is applied to the amplifier 514 from the tachometer generator 530 through the conductor 532 and switch contacts 526. The servo loop is closed by a follow-up signal voltage from the potentiometer 534 through conductor 535 and switch contacts 536. The operation of the error angle servo 504 may be described by the mathematical relation:

$$V_a A_z - V_x = V_a e$$

where $e$ represents the angular error of the aircraft yaw or heading. This relationship obtains because the follow-up potentiometer 534 is excited with the velocity signal voltage $V_a$ and the output shaft therefore assumes an angular position corresponding to the angular error in the yaw or heading.

A potentiometer 538 excited with the reference voltage, as indicated, includes a movable contact which is adjustably positioned by the output shaft of the error angle servo 504. Accordingly, the voltage developed on this movable contact corresponds to the instantaneous or yaw or heading error, $e$, and is applied through conductor 540 to any suitable display or indicating means in the sight head 10. Preferably, this error angle signal voltage, $e$, is utilized in a servo driven optical projection system (not shown) to angularly displace a movable index pointer 542 with reference to the fixed indices 544 on the combining glass 128 (FIGURE 3). To reduce the error angle to zero and thus achieve precise compensation for cross-wind effects, the pilot need only maintain the movable index 542 in alignment with the fixed indices 544. The angular displacement between these elements in the sight head display indicates to the pilot the extent of roll which must be imparted to the aircraft to produce the required change of yaw angle to reduce the error angle to zero. With the error angle maintained at zero in the bombing run from the pickle point to the point of bomb release, the velocity vector of the aircraft in ground coordinates is maintained in the vertical plane containing the pickle point, relative to the target, and the target, and the cross-wind effects are properly compensated to ensure accuracy of bomb delivery.

We claim:

A computer for aircraft to provide an indication of the change of heading required to compensate for effects of relative cross-wind of the air mass and a selected objective comprising first means for developing a signal quantity corresponding the cross-wind, second means for developing a signal quantity corresponding to the instantaneous value of aircraft velocity in the air mass transverse to the direction of the desired aircraft velocity vector with respect to the selected objective, third means interconnected with the first and second means for differentially combining said signal quantities for deriving a resultant cross-wind error signal quantity, and means connected with the third means for combining a signal quantity corresponding to aircraft velocity with the resultant cross-wind error signal quantity to derive a signal quantity corresponding to the change of heading required to maintain the aircraft velocity vector in the desired direction.

References Cited in the file of this patent

UNITED STATES PATENTS 2,849,184     Fredrick et al. _____ Aug. 26, 1958